US009632330B2

(12) United States Patent
Damin et al.

(10) Patent No.: US 9,632,330 B2
(45) Date of Patent: Apr. 25, 2017

(54) EYEWEAR WITH LOCKING LENS FRAME

(71) Applicant: Smith Optics, Inc., Ketchum, ID (US)

(72) Inventors: Marco Damin, Pianiga (IT); Michael Aaskov, Ketchum, ID (US); George T. Giroux, Ketchum, ID (US); James A. Chilson, Hailey, ID (US)

(73) Assignee: Smith Optics, Inc., Portland, OR (US)

( * ) Notice: Subject to any disclaimer, the term of this patent is extended or adjusted under 35 U.S.C. 154(b) by 130 days.

(21) Appl. No.: 14/308,564

(22) Filed: Jun. 18, 2014

(65) Prior Publication Data

US 2015/0370088 A1    Dec. 24, 2015

(51) Int. Cl.
*G02C 5/10* (2006.01)
*G02C 1/08* (2006.01)

(52) U.S. Cl.
CPC .............. *G02C 5/10* (2013.01); *G02C 1/08* (2013.01); *G02C 2200/08* (2013.01)

(58) Field of Classification Search
CPC ........ G02C 5/10; G02C 1/08; G02C 2200/08; G02C 5/22; F16C 11/00
USPC ............. 351/111–123, 90–102, 106; 16/293; 2/443
See application file for complete search history.

(56) References Cited

U.S. PATENT DOCUMENTS

| 2,730,012 | A | * | 1/1956 | Malcom, Jr. ............. | G02C 1/08 351/136 |
| 6,776,483 | B1 | * | 8/2004 | Wu ......................... | G02C 5/20 351/119 |
| 6,854,845 | B1 | | 2/2005 | Goldman et al. | |
| 7,232,215 | B2 | | 6/2007 | McNeal et al. | |
| D629,034 | S | | 12/2010 | McNeal et al. | |
| 8,316,470 | B2 | | 11/2012 | McNeal et al. | |
| D675,249 | S | | 1/2013 | Giroux | |
| 8,668,330 | B2 | * | 3/2014 | Reyes ..................... | A61F 9/025 351/106 |
| 8,800,067 | B2 | * | 8/2014 | Saylor .................... | A61F 9/025 2/443 |
| 2012/0180203 | A1 | | 7/2012 | Giroux et al. | |
| 2013/0083285 | A1 | | 4/2013 | McNeal et al. | |

OTHER PUBLICATIONS http://www.smithoptics.com/Root/Men's/Sunglasses/New/PIVLOCK-OVERDRIVE/p/OVPCDMBK, Sep. 2013.
Examiner's Report for Canadian Appl. No. 2893146 dated May 16, 2016.

* cited by examiner

*Primary Examiner* — Ricky Mack
*Assistant Examiner* — Kristina Deherrera
(74) *Attorney, Agent, or Firm* — Dorsey & Whitney LLP

(57) ABSTRACT

A lens frame locking mechanism comprises a temple and a link member. The temple is pivotally coupled to a periphery of the lens frame, for example at a first pivot attachment. The link member is pivotally coupled to the temple and to the periphery of the lens frame, for example at second and third pivot attachments. The temple is configured to pivot with respect to the lens frame about the first pivot attachment, and the link member pivots into a locking position defined with respect to the periphery of the lens frame.

14 Claims, 9 Drawing Sheets

EYEWEAR WITH LOCKING LENS FRAME

BACKGROUND

This disclosure relates generally to eyewear systems, and specifically to sport, safety, utility, and fashion eyewear with a lens frame locking mechanism. In particular, the disclosure concerns lens frame operating and locking mechanisms for sunglasses, goggles, spectacles, safety glasses, and other prescription, non-prescription and eyewear, in fixed and replaceable lens designs.

Glasses, goggles and other eyewear systems are extensively used in a wide range of different sports and optical applications, including sun protection, vision correction, vision enhancement and protective eyewear for snow sports, motor sports, biking, running, surfing and swimming. Professional-grade eyewear designs are also utilized in tactical and industrial applications, including impact-resistant tactical goggles, integrated night vision systems, welding glasses, and a wide variety of different safety glasses and safety goggle configurations.

Goggle eyewear typically includes a lens frame with an inner edge adapted to the contour of a user's face, with a strap or headband connected at opposite sides of the frame. Sunglasses, prescription glasses and safety glasses, on the other hand, typically utilize a temple arrangement, for example with two hinged temples connected to an eyewire or front frame and nose bridge support that extend to the rest on the ears of the user.

In snow sports and motor sport applications, a single oblong lens frame is common, but dual-lens goggle systems are also known, for example in swimming and road hike (motorcycle) applications. Similarly, while eyewear having temples may be configured with two separate lens frames, particularly in prescription lens applications, single-frame sunglasses and other single-lens eyeglass protection systems are also widely known.

Both goggles and other eyeglass systems are also commonly configured for use with helmets and other protective gear, and either may include intermediate attachments or support structures. While some in the industry may carefully distinguish between goggles with straps or headbands and eyeglass-type (e.g., having temples) eyewear, others may use the terms more interchangeably. As used herein, therefore, the term "eyewear" encompasses sunglasses, eyeglasses, goggles, safety glasses and other optical systems with either headband attachments or temples, in both one and two lens frame configurations for corrective, non-prescription, sporting, tactical, utility and fashion lens applications.

Across all of these different applications, there is a constant demand for uncompromising performance in the highest quality eyewear available. In particular, there is a continual desire for improved lens frame designs, adaptable to a broad range of professional grade eyewear in both fixed and replaceable lens configurations. At the same time, these designs must provide durability, versatility and dependability across a wide range of different environmental conditions, including heat, cold, sun, rain, snow, ice, dust, salt, sand, mud, and impact, whenever and wherever environmental conditions demand.

SUMMARY

This disclosure is directed to a lens frame locking system for eyewear. The mechanism may include, for example a temple or temple lug, and a link member. The temple can be pivotally coupled to a periphery of the lens frame, for example at a first pivot attachment. The link member can be pivotally coupled to the temple and to the periphery of the lens frame, for example at second and third pivot attachments, respectively. The temple can also be configured to pivot with respect to the lens frame, for example about the first pivot attachment, where the link member pivots into a locking position defined with respect to the periphery of the lens frame.

Depending on embodiment, the link member can be configured as an over-center element having positional stability in both the locking position, where the periphery of the lens frame is closed about a lens, and in an open position, where the periphery of the lens frame is opened. The first pivot attachment can be spaced from the third pivot attachment about the periphery of the lens frame, and the temple can be configured to close the periphery of the lens frame by pivoting the link member into the locking position. The temple can also be configured to span a gap between the first pivot attachment and the third pivot attachment, when the link member is pivoted into the locking position.

The link member can be pivotally coupled to the periphery of the lens frame at linkage extension, for example with the link member oriented substantially parallel to the extension when pivoted into the locking position by the temple. The temple may include or comprise a lug structure that substantially encloses the link member when pivoted into the locking position. A stop can be positioned adjacent the linkage extension, on the periphery of the lens frame, with an edge of the lug positioned adjacent the stop. Alternatively, a detent structure or other mechanism can be used to provide positional stability, in both the closed position, where the perimeter of the lens frame is closed, and in an unlocked position where the perimeter of the lens frame is opened.

In eyewear embodiments, a lens may be retained in the lens frame when the link member is pivoted into the locking position by the temple. In these embodiments, the temple can be further configured to pivot the link member into the open position, whereby the lens is released. One or more (e.g., at least two) indicia or coupling points may be distributed about the periphery of the lens frame, and/or on the temple or temple lug, with the indicia points selectively positioned for application of user forces to facilitate pivoting the temple and opening or closing the lens frame mechanism to lock or unlock the lens frame. The user forces can be applied by the user's fingers, in some cases by the fingers of one hand.

A reinforcing rib may extend on the lug, for example between the first pivot attachment and the second pivot attachment. An aperture can also be defined in the temple or temple lug, where the aperture is positioned and configured for visual access or to verify the position of the link, member, the linkage extension, and/or the third pivot attachment, when the link member is pivoted into the locking position.

Eyewear embodiments may include an eyewire defining a lens frame, and an over-center mechanism configured for locking and unlocking the lens frame. The over-center mechanism may comprise, for example, a temple lug pivotally coupled to the eyewire along a periphery of the lens flame, and a link member. The link member can be pivotally coupled to the temple lug and to a linkage feature extending from the periphery of the lens frame, e.g., from the lower eyewire. The temple lug can be configured to pivot the link member into a locking position with respect to the linkage extension, for example when the lens frame is closed about a lens.

The lens can be retained in the lens frame with the link member pivoted into the locking position. The temple lug can be further configured to pivot the link member into an open position with respect to the linkage extension, when the lens is released from the lens frame.

A lens groove can be formed along an inner surface of the lens frame, with a lens edge cut formed along an outer edge of the lens. The lens edge cut is typically configured to guide the lens into the lens groove while the temple lug pivots the link member into the locking position, and the lens groove can be configured to retain the lens in the lens frame by compressive coupling along the complementary surface or surfaces of the lens edge cut.

A first pivot attachment can be utilized to couple the temple lug to the front eyewire, with a second pivot attachment coupling the temple lug to a first end of the link member and a third pivot attachment coupling a second end of the link member to the linkage extension. The first and third pivot attachments are typically spaced along the periphery of the lens frame.

A reinforcing rib can be provided on the temple lug, extending between the first pivot attachment and the second pivot attachment. An aperture can also be defined in the temple lug, positioned for visual access to the link member, linkage extension, and/or third pivot attachment when the link member is pivoted into the locking position.

In some designs, the temple lug substantially encloses the link member and/or the linkage extension when the link member is pivoted into the locking position. A stop can be positioned adjacent the linkage extension along the periphery of the lens frame, with the temple lug is positioned adjacent the stop when in the locked position. A temple can also be coupled to the temple lug, for example via a hinge, where the temple is configured as a lever for pivoting the temple lug with respect to the eyewire, front frame or lens frame.

Suitable methods of using the lens frame mechanism include pivoting the temple or temple lug in a first direction with respect to the lens frame (or eyewire), where the temple operates as a lever arm for an over-center mechanism configured to close the perimeter of the lens frame and to retain a lens therein. The temple can also be pivoted in as second (e.g., opposite) direction with respect to the lens frame or eyewire, where the over-center mechanism is further configured to open the perimeter of the lens frame and to release the lens. Depending on embodiment, the lens may be replaceable, so that the user can repair the glasses or swap lenses based on environmental conditions or desired activity.

DETAILED DESCRIPTION

Figure 1:
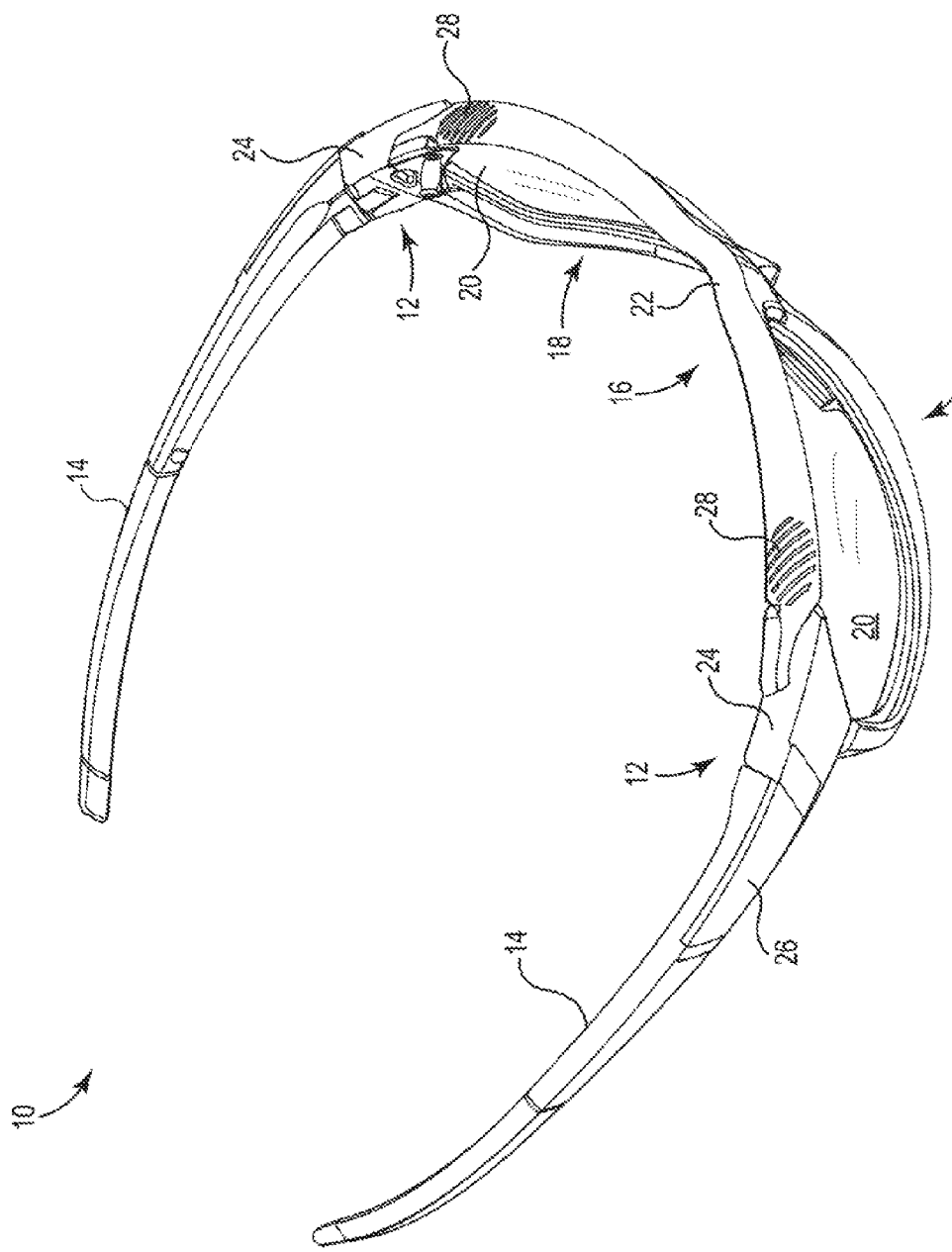
FIG. 1 is a perspective view of eyewear with an exemplary lens frame locking mechanism.

FIG. 1 is a perspective view of eyewear 10, with exemplary lens frame locking mechanisms 12. In this particular configuration, eyewear 10 is formed with two temples 14, connected to opposite ends of an eyewire or frame 16. Independent lens frame mechanisms 12 operate to open and close lens frames 18 about replaceable lenses (or lens elements) 20. Lens frame mechanisms 12 operate to lock lenses 20 within frame 16 in the closed or locked position, and to release lens elements 20 from frame 15 in the open or unlocked position, as described herein.

Eyewear 10 may be provided in a various forms including, but not limited to, sunglasses, prescription eyeglasses and protective eyewear embodiments, for example with frame 16 having two lens frames 18 and corresponding lens elements 20 separated by bridge 22, as shown in FIG. 1. In these examples, two independent lens frame mechanisms 12 may be provided, one for each separate lens frame 18 with corresponding lens element 20. Alternatively, a single lens frame 18 and lens 20 may be provided, for example in an oblong or goggle-type configuration, with either one or two operating mechanisms 12. In additional examples, eyewear 10 is provided with one or more lens frame mechanisms 12, independently of any lens elements 20.

Suitable lenses 20 include, but are not limited to, clear plastic or glass protective lenses, prescription lenses, shaded and tinted sunglass lenses, and polarized lenses. Lenses 20 may also include a variety of different optical coatings on one or both major surfaces, for example anti-reflective coatings, metallic or mirrored coatings, impedance matching and frequency filtering coatings, scratch-resistant coatings, and water, dirt, and oil-resistant (oleopliobic) coatings.

Lens frame mechanisms 12 may also take a variety of forms. As shown in FIG. 1, for example, each lens frame mechanism 12 is provided with a temple lug (or lug assembly) 24 configured to open (or unlock) and close (or lock) the corresponding lens frame 18, in order to release or retain lens elements 20 within frame 16. In this particular configuration, each lug 24 is also coupled to a temple 14, for example a hinged temple 14 configured to operate as a lever arm for lens frame mechanism 12.

Alternatively, a separate lever element may be provided, or lug 24 may operate as a lever arm independently of temple 14. For example, eyewear 10 may be provided in a goggle-type embodiment, with a strap or headband coupled to frame 16 or to lug or lever component 24, without separate temples 14. In other examples, temples 14 may be provided with one or more badges 26, either for ornamental purposes, or to provide a reinforced structural coupling to lug 24, or for both ornamental and structural purposes.

Depending on design, one or more coupling points or indicators 28 may also be used to facilitate hand or finger placement on frame 16 and lens frame 18 during operation of mechanism 12. For example, indicators 28 may be formed as a texture, indentation, protrusion, surface treatment or other feature to improve coupling to frame 16 (e.g., between frame 16 and the user's finger or hand), and to provide a preferred location for (e.g., compressive) coupling to the top or bottom of lens frame 18, or both, during operation of mechanism 12.

Figure 2:
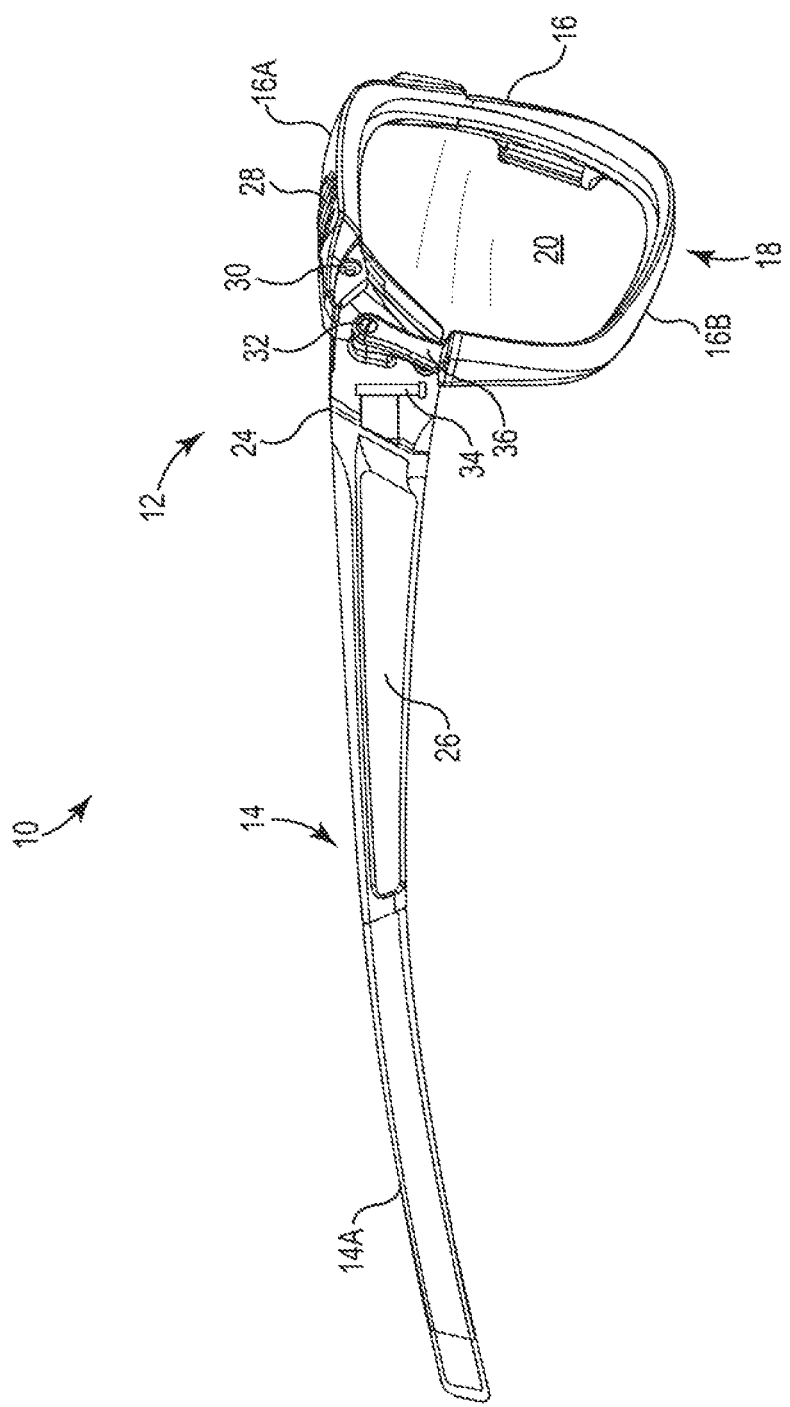
FIG. 2 is a side view of the eyewear, showing the lens frame locking mechanism.

FIG. 2 is a side view of eyewear 10, with locking mechanism 12 in a closed position. Locking mechanism 12 is illustrated in cutaway view, in order to show internal components including pivot couplings or attachments 30 and 32.

In this particular embodiment of eyewear 10, temple 14 extends from temple tip (or earpiece) 14A to lug 24, utilizing a hinge pin 34 or other mechanical coupling mechanism so that temple 14 can be folded toward frame 16. In some embodiments, the temple 14 may not be connected through a coupling mechanism to be folded, but instead, fixed in an "unfolded" temple position relative to the frame 16. Lug 24 is pivotally coupled to upper eyewire (or superior frame) 16A at pivot attachment 30, positioned along the upper periphery of lens frame 18. Lug 24 is pivotally coupled to lower eyewire inferior frame) 16B via a link mechanism attached to lens frame extension (or linkage extension) 36 at pivot attachment 32, for example an over-center link, mechanism as shown in FIG. 3.

Figure 3:
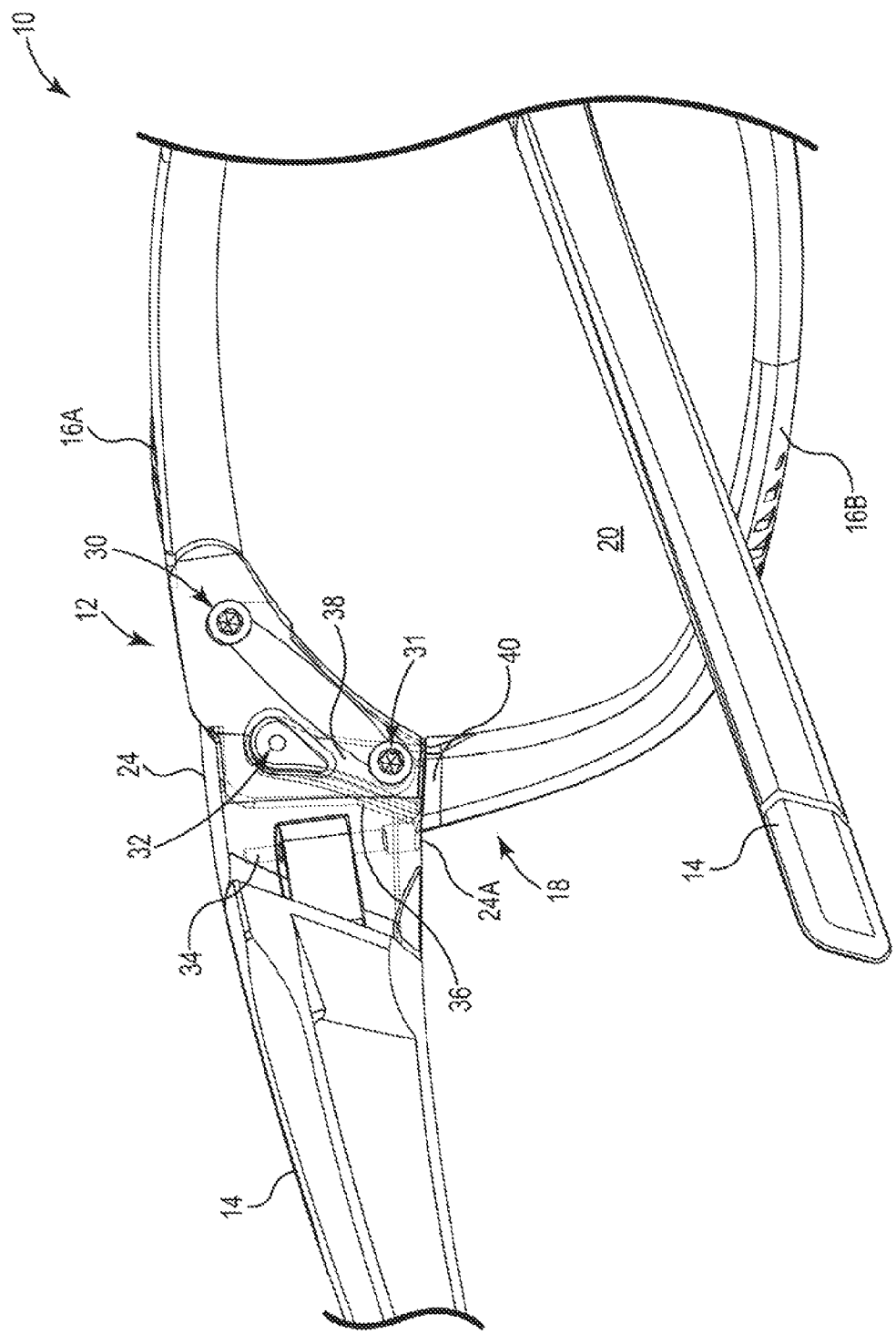
FIG. 3 is a rear detail view of the lens frame mechanism, in cutaway view.

FIG. 3 is a rear detail view of lens frame mechanism 12 for eyewear 10, with lug 24 in cutaway view to show link member (or linkage) 38. Link member 38 is positioned inside lug 24, with the first end of link member 38 pivotally coupled to lug 24 at lower (bottom) pivot attachment 31, and the second (opposite) end of link member 38 pivotally coupled to linkage extension 36 on the lower periphery of lens frame 18, for example at pivot attachment 32 on lower eyewire 16B. Lug 24 extends from temple 14, and is pivotally attached to the upper periphery of lens frame 18, for example via pivot attachment 30 to upper eyewire 16A as described above with respect to FIG. 2.

Figure 4:
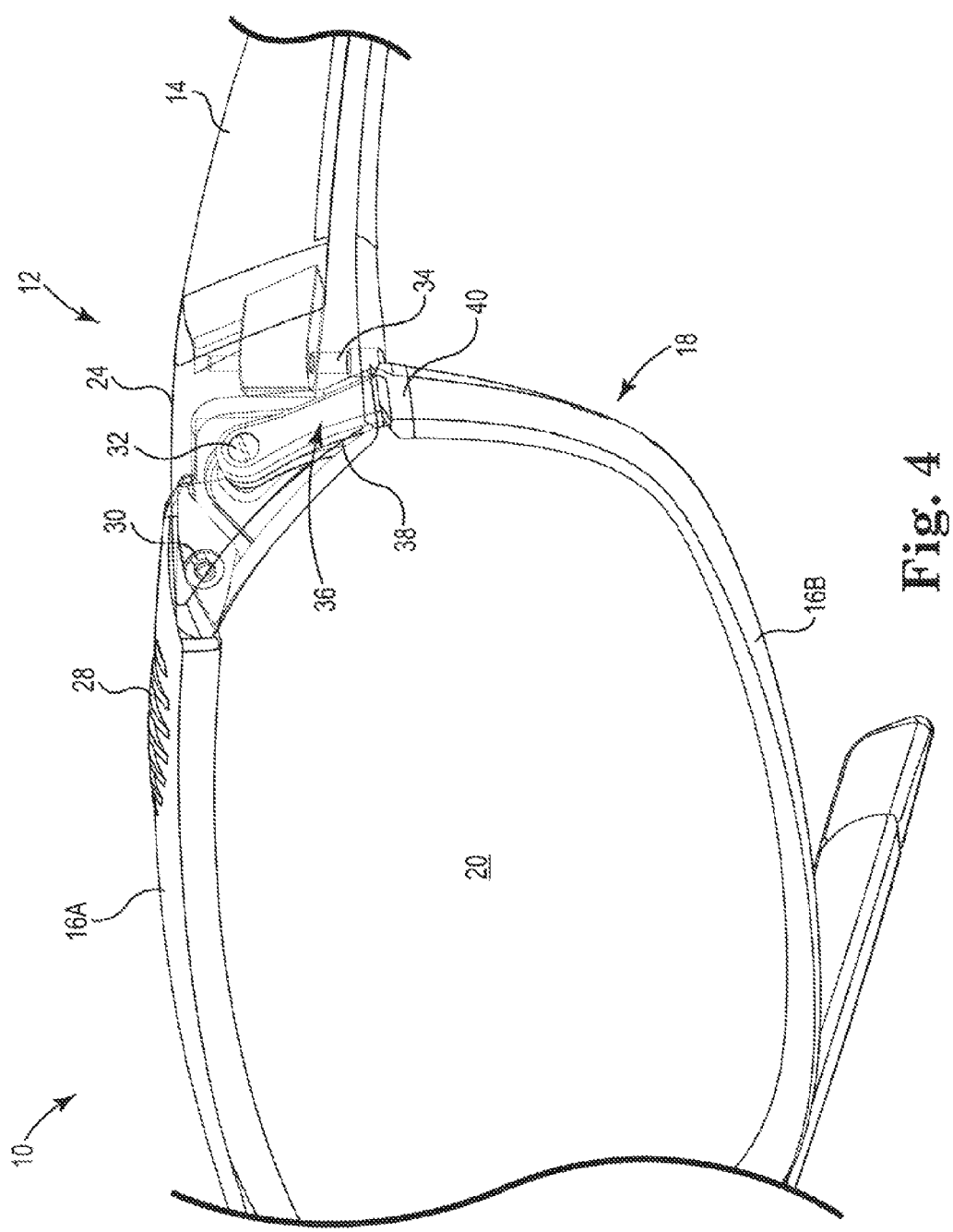
FIG. 4 is a front detail view of the lens frame mechanism, in cutaway view.

As shown in FIGS. 3 and 4, link member 38 forms an over-center lens frame mechanism 12, with one end of link member 38 pivotally attached to linkage extension 36 of lens frame 18 at pivot attachment 32, and the other (opposite) end of link member 38 pivotally attached to temple 14 via pivot attachment 31 to lug 24. In the closed or locked position of FIG. 3, lens frame mechanism 12 generates a biasing force to retain lens 20 within lens frame 18, with bottom edge 24A of lug 24 positioned against stop 40. Stop 40 may be formed on the adjacent periphery of lens frame 18, for example where linkage extension 36 extends from lower eyewire 16B as shown. Alternatively, linkage extension 36 may simply be defined or formed as an end of lower eyewire 16B, and a different stop configuration or detent mechanism may be used to stabilize lens frame mechanism 12 in the closed or locked position.

FIG. 4 is a front detail view of lens frame mechanism 12 for eyewear 10, with lug 24 in cutaway view. As shown in FIG. 4, lug 24 extends along the perimeter of lens frame 18 between stop 40 in lower eyewire 16B and upper eyewire 16A, and across the gap between linkage extension 36 of lens frame 18 and pivot attachment 30 on upper eyewire 16A.

Eyewear 10 and lens frame mechanism 12 may be formed of a variety of flexible, durable plastics and other suitable polymer materials, metal materials, natural materials such as wood, leather, or shell, and combinations thereof. In particular examples, upper and lower eyewires 16A and 16B may be formed of as flexible plastic, with pivot attachments 30, 31, 32 and hinge 34 formed of metal pins or screws, for example using TORX type machine screws or other suitable pivoting mechanical attachments. Link member 38 may also be formed of as metal material, for example a steel sheet or plate with holes configured to receive screws or other pivot attachments 31 and 32 at each end.

Linkage extension 36 serves as a flexible link in lens frame 18, providing over-center lens frame mechanism 12 with sufficient bias force to retain the edge of lug 24 in stable position against stop 40. In this closed position, lens 20 is locked into place inside lens frame 18, between upper eyewire 16A and lower eyewire 16B. In over-center embodiments and other bi-stable configurations, lens mechanism 12 is also positionally stable in the open configuration, for example to release and replace individual lens elements 20 as shown in FIG. 5.

Figure 5:
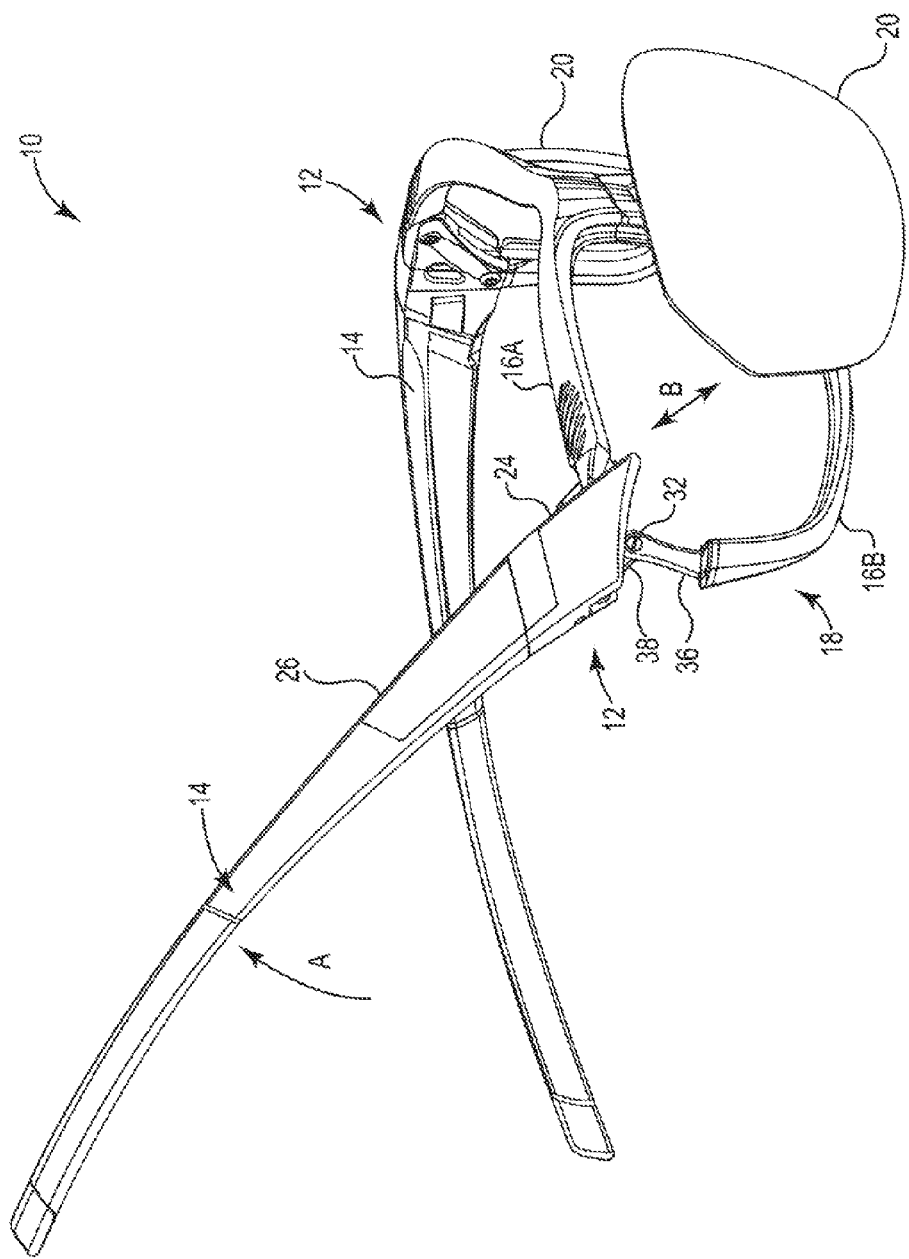
FIG. 5 is a perspective view of the eyewear, with lens frame mechanism in an open position.

FIG. 5 is a perspective view of eyewear 10, showing lens frame mechanism 12 in an open or unlocked position. As shown in FIG. 5, temple 14 with lug member 24 serves as a lever arm for over-center lens mechanism 12. Lifting temple 14 (arrow A) causes lug 24 to pivot or rotate upward in a first direction (clockwise in FIG. 5) about the pivot connection to the upper periphery of lens frame 18, formed by upper eyewire 16A. Over-center link member 38 pivots or rotates about pivot attachment 31 to lug 24 and pivot coupling 32 to linkage extension 36, formed by or at the end of lower eyewire 16B along the lower circumference of lens frame 18.

As a result the opening operation of mechanism 12, the periphery and opening area of lens frame 18 expand, allowing lens 20 to be inserted into or released from lens frame 18. In the open position of FIG. 5, the user can remove, replace or install one or more different individual lens elements 20 (arrow B), providing eyewear 10 with substantial flexibility for use in different activities and under a wide range of different environmental and lighting conditions.

Lowering temple 14 causes lug 24 to pivot down in a second direction (counterclockwise in FIG. 5; opposite arrow A), so that over-center link member 38 pivots back down and lens frame mechanism 12 engages to lock lens frame 18 around lens 20. Lens frame mechanism 12 thus has a bi-stable design, as described above, in which lens frame mechanism 12 is positionally stable in the closed position to lock lens 20 into lens frame 18, as shown in FIGS. 2-4, and positionally stable in the open position to release lens 20 from lens frame 18, as shown in the open or unlocked configuration of FIG. 5.

Figure 6:
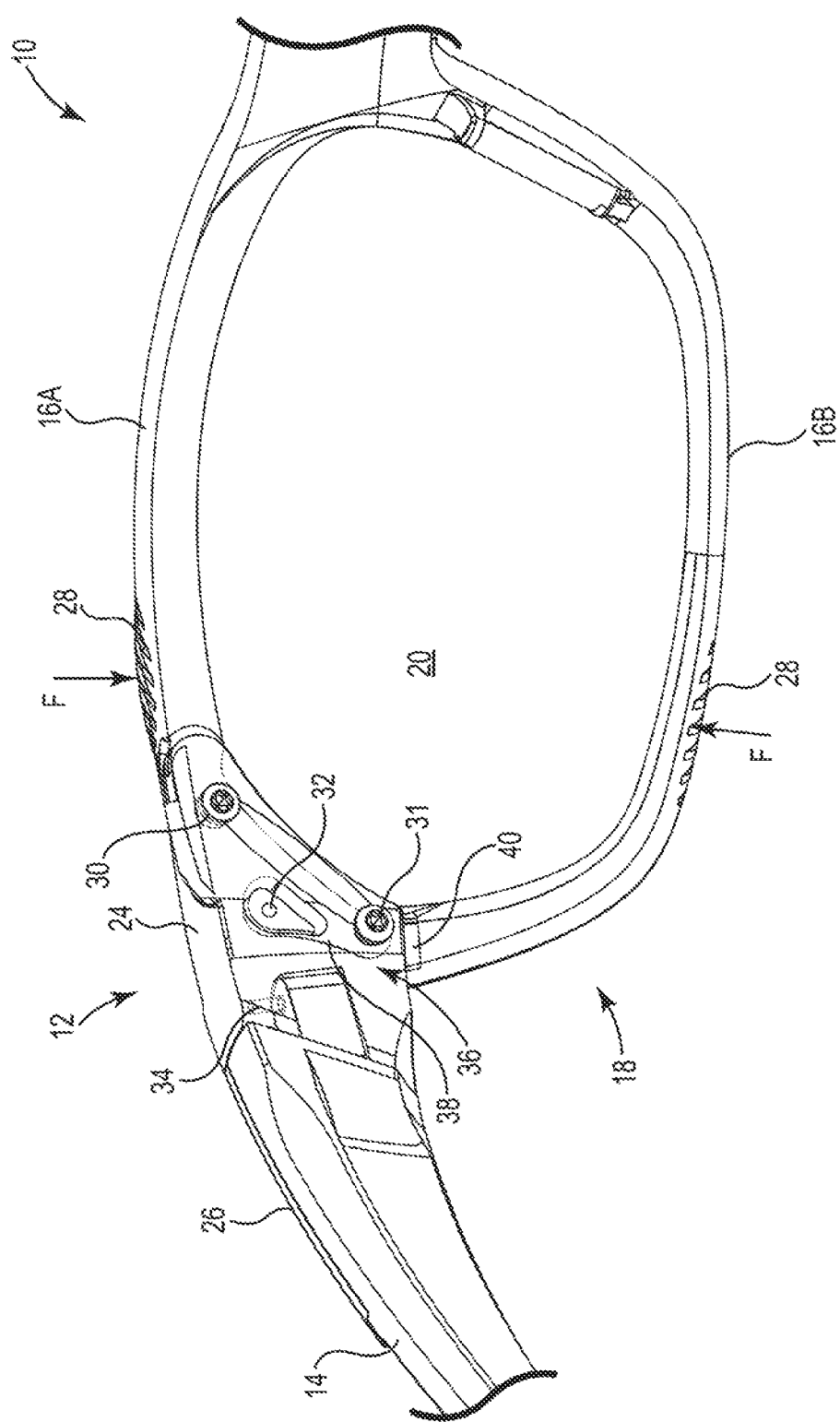
FIG. 6 is a rear detail view of the lens frame mechanism, showing compressive coupling locations.

FIG. 6 is a detail view of eyewear 10, showing indicators 28 for operation of lens frame mechanism 12 by application of force or pressure on lens frame 18 (arrows F). In this particular example, coupling point indicators 28 are provided in the form of textured or colored indicia positioned about the periphery of lens frame 18, or other visual or tactile indicators located on one or both of upper eyewire 16A and lower eyewire 16B. One or more coupling point indicators 28 may also be provided on lug 24 or temple 14, for example in the form of a badge or reinforcing member 26.

FIG. 6 also shows that in the closed position of lens frame mechanism 12 link member 38 may be pivoted into a substantially parallel configuration with respect to linkage extension 36 of lens frame 18, at the end of lower eyewire 16B opposite bridge 22, and proximate lug 24 and temple 14. In this configuration, flexible extension 36 provides a bias force maintain positional stability of lens frame 18 in compressive coupling about lens 20, for example with the bottom edge of lug 24 positioned against stop member 40 as described above. Alternatively, link member 38 may be over-rotated past parallel with respect to linkage extension 36, or under-rotated before parallel, and a detent mechanism may be used to provide positional stability.

Because lens frame mechanism 12 operates via compressive coupling and decoupling) of lens frame 18 about lens 20, manipulation of temple 14 (or other lever mechanism) can be facilitated by positioning the user's fingers or hands at selected points on eyewear 10. The selected positions include coupling points identified by indicators 28 on upper and lower eyewire members 16A and 16B, which allow the user to apply an additional force or load to facilitate compressive coupling of lens frame 18 about lens 20. In some embodiments an additional coupling point indicator may be provided on temple 14 or lug 24, for example to provide for single-handed operation by application of the user's index finger to the reinforcing member or badge indicator 26, with the user's thumb at coupling point indicator 28 on lower eyewire 16B, and the user's second or third finger at coupling point 28 on upper eyewire 16A.

Similarly, coupling point indicators 26 and 28 may also be positioned to improve operation of lens frame mechanism 12 during the opening operation, for example with the user's thumb and first or second finger of one hand located at coupling points/indicators 28 on upper and lower eyewire 16A and 16B, respectively, and the thumb and first or second finger of the user's second band located on the top and bottom of temple 14 at or near indicator 26. Coupling points/indicators 26 and 28 may also be textured, as described above, or provided with a non-slip material, in order to improve grip and coupling efficiency during operation of lens frame mechanism 12.

Figure 7:
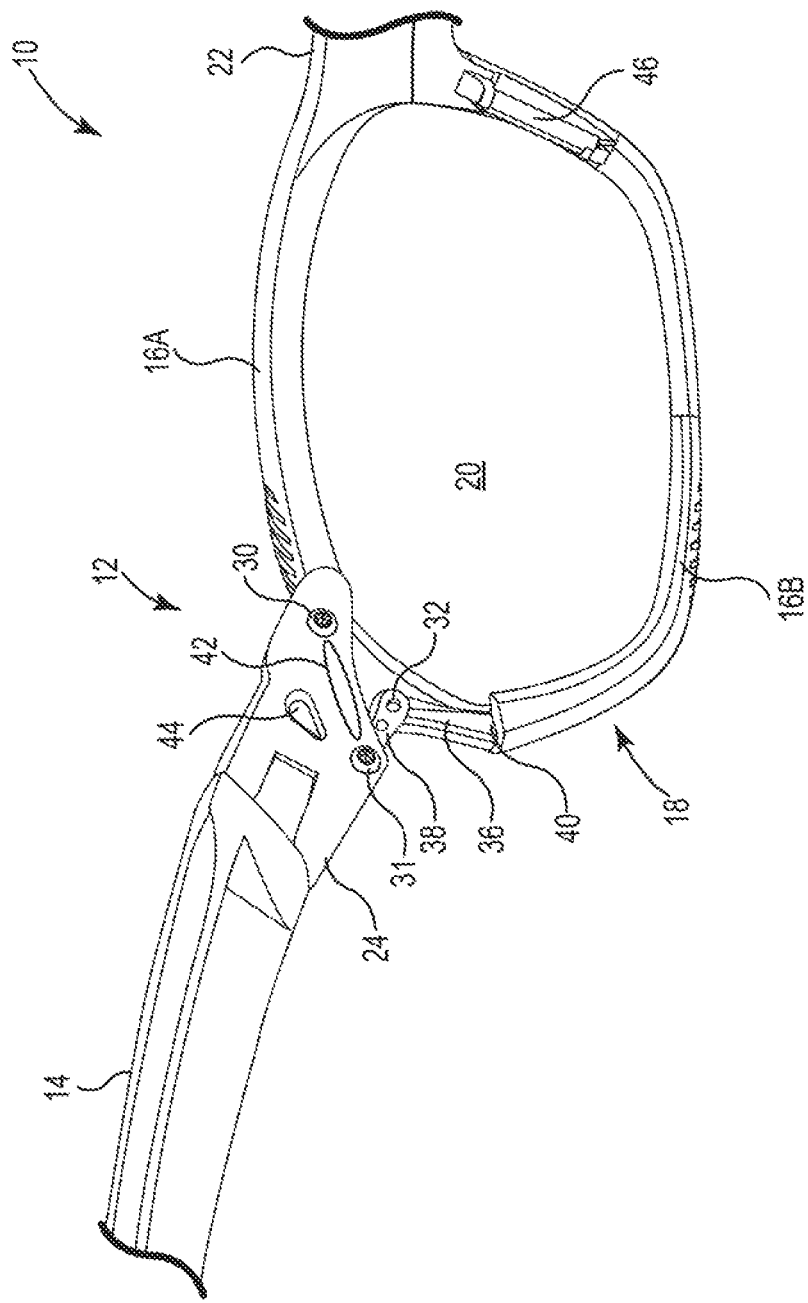
FIG. 7 is a rear view of the eyewear, with locking mechanism in an open position.

FIG. 7 is a detail view of eyewear 10 and lens frame 18, with lens frame mechanism 12 in an open position. As shown in FIG. 7, link member 38 has been pivoted up and away from linkage extension 36 about pivot attachment 32, opening the perimeter of lens frame 18 to allow for insertion or removal of lens 20 from eyewear 10.

As shown in FIG. 7, lug 24 may include additional features include reinforcing member or rib structure 42, in order to increase strength and provide stress and cracking resistance between pivot attachments 30 and 31. One or more apertures 44 may also be included to facilitate flushing and cleaning of debris from lug 24, and to provide visual or mechanical access to pivot attachment 32, for example to verify the positioning of lug 24 with respect to linkage extension 36 when lens frame mechanism 12 is in the closed position. Eyewear 10 may also provide additional functional, safety and comfort features, for example nose pads 46 to maintain the position of bridge 22 during physical activity of the user.

Figure 8:
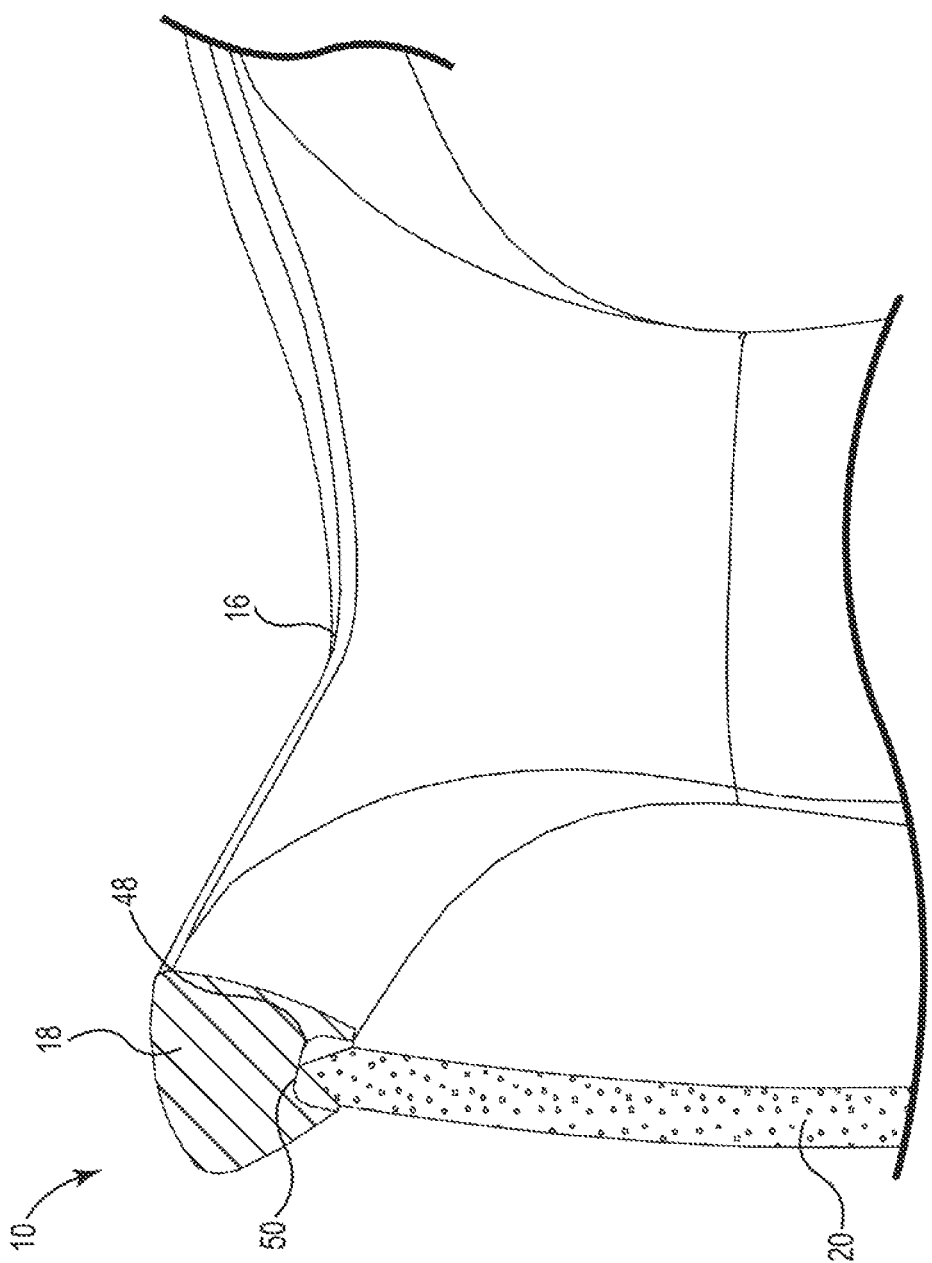
FIG. 8 is a sectional view of the eyewear, showing lens engagement features.

FIG. 8 is a sectional view showing engagement features 48 and 50 for use in coupling and retention of lens 20 within lens frame 18 of eyewear 10. In this particular embodiment, the coupling features include a lens groove or channel 48 formed along the outer perimeter of lens frame 18, as defined by frame 16 as shown in FIG. 8. A complementary edge cut (e.g., chamfer or bevel) 50 may also be formed along the outer perimeter of lens 20.

In one design, a U-shaped lens groove 48 is provided in lens frame 18, in combination with a V-shaped edge cut 50 on lens 20. In use, the lens edge cut or chamfer 50 helps guide lens 20 into lens groove 48, improving positioning and fit while closing lens frame 18 about lens 20 during locking operation of the lens frame mechanism, as described herein. More broadly, an oval, round, U-shaped or V-shaped lens groove 48 may be provided on the inner surface or inner perimeter of lens frame 18, in combination with a chamfered, beveled, rounded or other suitable lens edge cut 50 on the outer edge or outer periphery of lens 20, so that lens groove 48 is configured to retain lens 20 by compressive coupling along the complementary surface or surfaces of lens edge cut 50.

Figure 9:
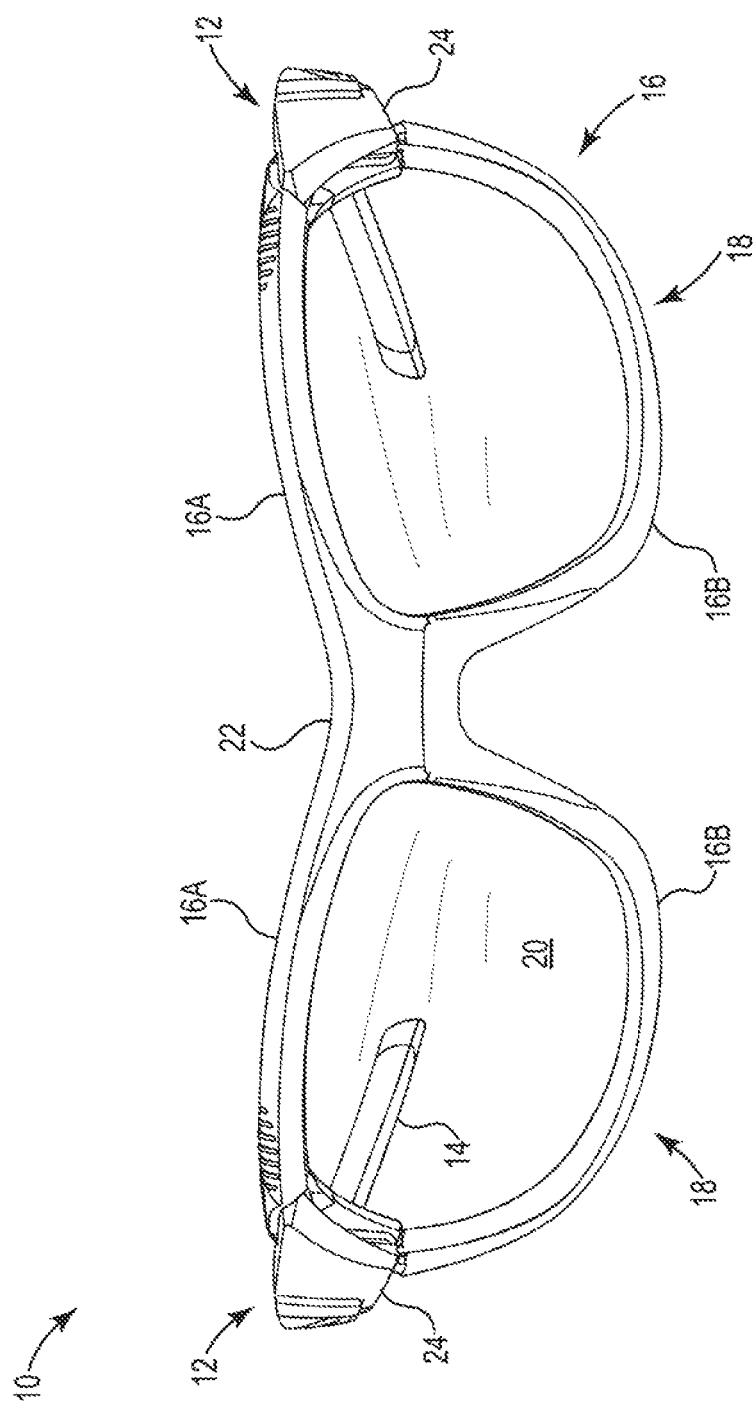
FIG. 9 is a front view of the eyewear, in a split frame configuration.

FIG. 9 is a front view of eyewear 10, with frame 16 in a split configuration. In this particular embodiment, two lens frames 18 are provided, as defined by the openings in frame 16 between upper evewire 16A and lower eyewire 16B at the upper and lower perimeter of each lens frame 18, and between bridge 22 and lugs 24 at the inner and outer perimeter of each lens frame 18, respectively. Independent lens frame mechanisms 12 are provided for locking individual lenses 20 into each lens frame 18, and to release lenses 20 for removal and replacement, as described herein.

In split frame embodiments of eyewear 10, upper eyewire 16A and lower eyewire 16B are formed of different components and may be mechanically coupled using a variety of different methods, for example with one or more screws or other mechanical fasteners at bridge 22, or via a welding process. Thus, the materials of upper and lower eyewire 16A and 16B may be different, for example using a relatively stiffer material for upper eyewire 16A and a relatively more flexible material for lower eyewire 16B, in order to facilitate the compressive coupling of lens frames 18 around individual lenses 20. Alternatively, upper and lower front eyewires 16A and 16B may be formed of the same or similar materials, and front eyewire 16 may be formed as a unitary structure.

While this invention has been described with reference to exemplary embodiments, it will be understood by those skilled in the art that various changes can be made and equivalents may be substituted for elements thereof, without departing from the spirit and scope of the invention. In addition, modifications may be made to adapt the teachings of the invention to particular situations and materials, without departing from the essential scope thereof. Thus, the invention is not limited to the particular examples that are disclosed herein, but encompasses all embodiments falling within the scope of the appended claims.

The invention claimed is:

1. A lens frame system comprising:
    a lens frame including an upper frame portion and a lower frame portion;
    a temple pivotally coupled to the lens frame;
    a temple lug connecting the temple to the lens frame, wherein the temple lug is pivotally coupled to the upper frame portion at a first pivot attachment; and
    a link member having a first end and a second end, wherein the first end is pivotally coupled to the temple lug at a second pivot attachment and the second end is pivotally coupled to the lower frame portion at a third pivot attachment;
    wherein the temple lug is configured to pivot about the first pivot attachment from a closed position to an open position to cause the link member to pivot about the third pivot attachments and to cause a distance between the upper frame and the lower frame to increase.

2. The lens frame system of claim 1, wherein the link member is configured as an over-center element having positional stability in the closed position.

3. The lens frame system of claim 1, wherein the first pivot attachment is spaced from the third pivot attachment and wherein a distance between the first pivot attachment and the third pivot attachment is reduced by pivoting the temple lug into the closed position.

4. The lens frame system of claim 3, wherein the temple lug is configured to span a gap between the first pivot attachment and the third pivot attachment when the link member is pivoted into the closed position.

5. The lens frame system of claim 1, wherein the third pivot attachment is located at a linkage extension, and wherein the link member is oriented substantially parallel to the linkage extension when the temple lug is pivoted into the closed position.

6. The lens frame system of claim 5, wherein the temple lug encloses at least a portion of the link member when pivoted into the closed position.

7. The lens frame system of claim 6, further comprising a stop positioned adjacent the linkage extension and wherein an edge of the temple lug is positioned adjacent the stop when the link member is pivoted into the closed position.

8. The lens frame system of claim 1, further comprising a lens retained in the lens frame when the link member is pivoted into the closed position by the temple lug, and wherein the temple lug is further configured to pivot the link member into the open position whereby the lens is released.

9. The lens frame system of claim 1, further comprising at least two indicia distributed about a periphery of the lens frame to indicate positions for application of user forces to facilitate pivoting the temple lug.

10. The lens frame system of claim 1, further comprising: a reinforcing rib extending along the temple lug between the first pivot attachment and the second pivot attachment; or an aperture defined in the temple lug, wherein the aperture is configured for visual access to the third pivot attachment when the link member is pivoted into the closed position.

11. The lens frame system of claim 1, wherein the link member is positioned inside the temple lug when the temple lug is pivoted to the closed position.

12. The lens frame system of claim 1, wherein the temple lug is pivotally coupled to the temple.

13. The lens frame system of claim 1, wherein the third pivot attachment is between the first pivot attachment and the second pivot attachment when the temple lug is in the closed position.

14. A method comprising:
pivoting a temple lug connecting a temple to a lens frame in a first direction with respect to the lens frame, wherein the temple lug operates as a lever arm for an over-center mechanism configured to reduce a perimeter of the lens frame and to retain a lens therein;
pivoting the temple lug in a second direction with respect to the lens frame, wherein the over-center mechanism is further configured to expand the perimeter of the lens frame and to release the lens therefrom; and
replacing the lens with a replacement lens.

* * * * *